Figure 4:
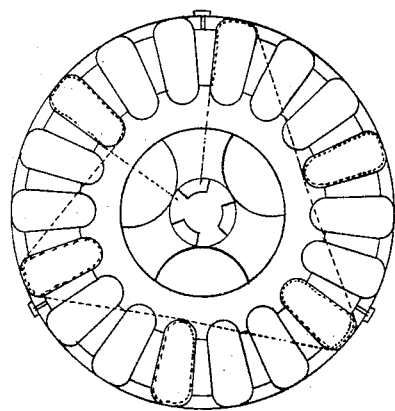

(No Model.) 2 Sheets—Sheet 1.
J. J. WOOD.
DYNAMO ELECTRIC MACHINE.
No. 243,746. Patented July 5, 1881.
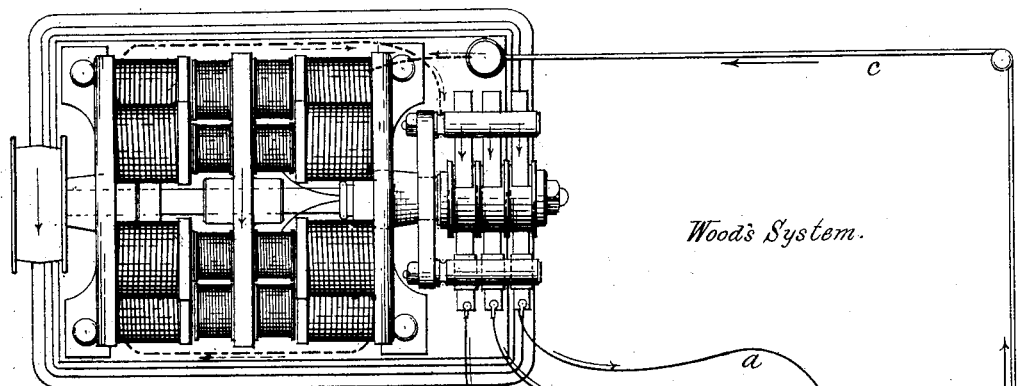
FIG-1-
Wood's System.
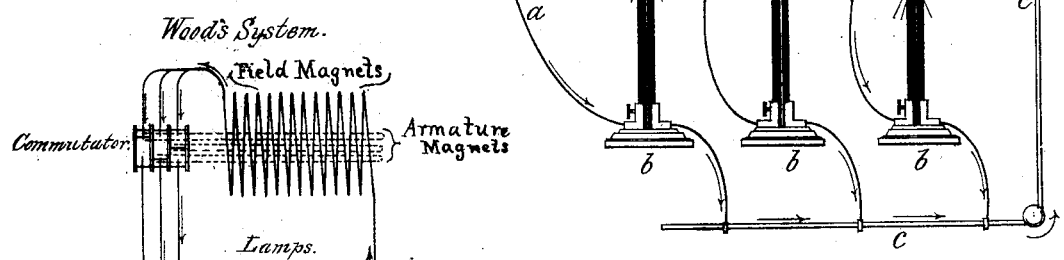
FIG-2-
Wood's System.
Field Magnets
Commutator. Armature Magnets
Lamps.
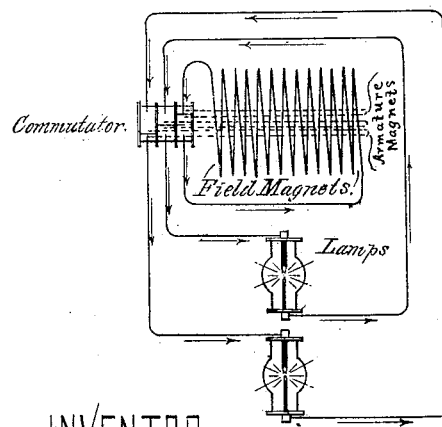
FIG-3-
Commutator. Armature Magnets
Field Magnets
Former System.
Lamps
ATTEST-
Chas. M. Higgins
Geo. E. Gavin
INVENTOR
James J. Wood.
by G. H. Wales & Son
attys
N. PETERS, Photo-Lithographer, Washington, D. C.

(No Model.) 2 Sheets—Sheet 2.

J. J. WOOD.
DYNAMO ELECTRIC MACHINE.

No. 243,746. Patented July 5, 1881.

WITNESSES
A. W. Robertson
O. W. Turner

INVENTOR
Jas J. Wood
BY T. J. W. Robertson
ATTORNEY.

UNITED STATES PATENT OFFICE.

JAMES J. WOOD, OF BROOKLYN, ASSIGNOR TO THE FULLER ELECTRICAL COMPANY, OF NEW YORK, N. Y.

DYNAMO-ELECTRIC MACHINE.

SPECIFICATION forming part of Letters Patent No. 243,746, dated July 5, 1881.

Application filed April 7, 1880. (No model.)

*To all whom it may concern:*

Be it known that I, JAMES J. WOOD, of Brooklyn, Kings county, New York, have invented certain new and useful Improvements in Electric Lighting, of which the following is a specification.

This invention consists in a novel mode of distributing or dividing the electric current from one generator to a number of lamps, or in so arranging the connections between such lamps and the parts of the generator as to maintain a number of lights in the same circuit and from one generator. It contemplates more especially the use of such generators as are usually termed "dynamo," in which the exciting-magnets are maintained by the current which they excite, and also such as have an armature composed of a series of distinct coils or distinct group of coils, the currents from which may be divided into several small currents or combined into one great current at the commutator.

Heretofore, in seeking to maintain a number of lights from one generator of this kind, the usual system of arrangements has been as shown in diagram in Figure 3—that is, a number of distinct sections of the commutator connect at opposite sides, each section independently, to opposite terminals of a corresponding number of lamps, thus forming a number of small and independent circuits from the machine, each maintaining a lamp, while the current from the remaining section or sections of the commutator is circulated independently through the magnets of the generator, thus forming another independent circuit to maintain the magnetic field of the machine.

According to my improved system, which is shown in diagram in Fig. 2, I connect each section of the commutator on one side independently with the like terminals of a corresponding number of lamps, and I connect all the opposite terminals together and to the magnet-coils, which, in turn, connect to the opposite side of the commutator, so that the entire current of the machine is divided on one side of the commutator into a number of small currents, each going to a distinct lamp, while all these small currents blend from the opposite poles of the lamps into one great or compound current, which circulates in its entirety through the magnet-coils and returns to the opposite side of the commutator, through which it again divides in the same proportion as it issues from the opposite side. This arrangement constitutes the essential feature of my present invention, and produces important results, as hereinafter set forth.

My improved system of electric lighting is shown more fully in Fig. 1, which gives a plan view of a dynamo-electric machine connected with a number of lamps. This machine may be of any suitable construction within the described kind; but I have represented one of my own invention, described in a pending application. In this generating-machine the armature revolves between a multipole-magnet on each side, and the armature is formed with groups of bobbins, each group being composed of a number of bobbins equal to the number of magnet-poles. As the present machine has six magnet-poles on each side of the armature, I prefer to provide the armature with three groups of bobbins, having six bobbins in each group, and the commutator has hence three sections corresponding to these three groups, with a corresponding number of contact-springs on each side, which collect and transmit the currents therefrom. Fig. 4 of the drawings shows eighteen bobbins, with a group of six bobbins having their circuit-wires in view. The circuits of the other two groups of six bobbins are made in a similar manner. Heretofore I have combined these several small currents into one great current, which is circulated through the magnets and also through one or more lamps placed in continuous line or series in the usual arrangement, which lamps, however, cannot be of any great number in such arrangement. Now, according to my improved system the contact springs or brushes on one side of the commutator are insulated from each other, and each one is connected by an independent wire, *a a*, with the like terminals of a series of lamps, *b b b*, one wire connecting to each lamp, while the opposite terminals of these lamps all connect to the same main wire, *c*, which connects to one end of the magnet-coils, and the opposite end of the magnet-coils connects to the spring-holder at the other side of the commutator. Hence by this arrangement the entire current of the armature is divided at one side into a number of small or sectional currents corresponding to the sections of the armature and commutator, and each of these small or sectional currents go to one side of each lamp, while the currents all blend from the opposite side of the lamps into one great current, which circulates through the field-magnets, and thence goes to the opposite side of the commutator, through the sections of which it divides as usual. In other words, by this system the entire current of the armature is divided for the lamps and combined for the magnets. This is believed to constitute an important improvement in the art of electric lighting where the carbon-arc or point-to-point lamps are used, as it enables a large number of small lights of this kind, which at present are the most practical and economical kind, to be maintained from one generator, and in a reliable and economical manner, thus obtaining a large distribution of the light.

To give practical examples, a generator of the described kind running at twenty-three hundred revolutions a minute and connected with a number of lamps in continuous line or series can barely maintain three lights. Connected, however, in my improved manner four lights have been maintained with a speed of only six hundred revolutions, and eight lights at a speed of one thousand revolutions, without any change in the machine proper, but simply in the connections, as already described.

In the former system of division into sectional currents, as indicated in Fig. 3, it will be observed by comparison with my improved system of sectional division, as shown in Fig. 2, that with the same number of sections the old system allows, say, of only two lamps, where my system allows of three. Furthermore, in the former system, as but a section of the whole current goes to the magnets, hence the magnetic field of the machine is weak, and the entire current generated is correspondingly weak, and the lights produced must be accordingly of low power. In the new system, however, as the entire compound current of the armature goes to the magnets, the magnetic field is hence of great strength and the current induced in the armature correspondingly strong, and the lights produced are of high power; hence the new system enables one small generator to produce a large amount of light in a number of small lights distributed over a wide area, which has been heretofore the great desideratum in the electric-arc system of illumination.

It will also be observed that in my new system each lamp is independent of the other, so that should one lamp become extinguished it will proportionately lower the magnetic field and the force of the current, but not otherwise affect the operation of the apparatus, so that the greater the number of lights the less will the majority be affected by the extinguishment of a few.

It will also be observed that in this system the increase of the number of lamps will not increase the resistance of the main circuit, but, unlike the continuous system of connection, will reduce the resistance of the entire circuit in proportion to the addition.

It is further believed that every distinct coil or bobbin in the armature may be arranged to support a distinct light. Thus the machine represented in Fig. 1, which is intended to contain eighteen bobbins, as shown in Fig. 4, may be so arranged as to support eighteen distinct lights in lieu of three, in the same manner as already described.

The lamps used in this system may be of any suitable kind—either the "point-to-point," the "candle," or the "incandescent" kind. The latter, however, is not particularly contemplated or desired, on account of its high resistance and low illuminating power. The point-to-point lamps are preferred, but I have shown the candle-lamps in the drawings for the sake of simplicity.

I am aware that the expedient of dividing the circuit around the field-magnets into several branches or distinct windings, each connecting to one side of the lamps, while all the other ends of the windings connect to one terminal of the generator, and all the opposite sides of the lamps connect to the other terminal of the generator, has been adopted; but my system is obviously distinct from this, and on consideration will be found to possess many advantages, both electrical and otherwise. Thus, my system requires but one large circuit around the field-magnets, and hence the winding thereof is much simpler and cheaper, and a large quantity of wire may be obtained within a small space, whereas a multiplex winding is difficult and expensive to make, and, owing to the space occupied by the insulation on each course, is bulky without corresponding conductive efficiency. Again, my system, of course, requires a sectionally-wound armature; but as all armatures are necessarily wound in sections, while field-magnets are not, my system, hence, does not, as before remarked, require any change in the construction of the best plan of existing generators, but simply in the connections of the parts thereof with each other and with the lamps. Moreover, by this system a much more certain and uniform division of the current is insured, for the reason that each lamp connects to one of the insulated springs on one side of the commutator, and each is thus supplied by a distinct section of the armature, so that, obviously, if the current is established at all it must divide itself equally to each lamp, for each section of the armature by this system becomes virtually a distinct generator, each maintaining a distinct light, yet all having the same field-magnets; and should one section of the armature fail, or should one lamp become extinguished, no unusual strain will be put upon any other part of the apparatus, nor will the current to the other lamps be increased. On the contrary, in the system above referred to, as all the coils of the armature are connected in series, should one coil fail the whole apparatus becomes inoperative; or, on the other hand, should one of the branches of the multiple field-magnet coils become inoperative, or should one or two lamps go out, the other branches and lamps will receive the entire current of the armature, which in some cases may be more than they can endure, and in any case the current will divide itself to the lamps, not equally and uniformly, but in proportion to their respective resistances.

What I claim as my invention is—

1. An electric lighting apparatus consisting of a magneto-electric machine having an armature formed with a series of two or more distinct coils or groups of coils, and a commutator having corresponding sections, with collecting and transmitting springs bearing thereon, in combination with a series of two or more lamps each connected on one side with one of the springs on one side of the commutator, and all connected on the opposite side to one common or main conductor connected with the several springs at the opposite side of the commutator, substantially as and for the purpose herein set forth.

2. An electric lighting apparatus consisting of a dynamo-electric generator having an armature formed with two or more distinct coils or sections, and a commutator with corresponding sections connected therewith, with collecting and transmitting springs bearing thereon and mutally insulated on one side of the commutator, in combination with a series of two or more lamps, each connected independently on one side with one of the said insulated springs, and all connected at the opposite side to the coils of the field-magnets, which, in turn, connect to the opposite side of the commutator, substantially as and for the purpose herein shown and described.

JAMES J. WOOD.

Witnesses:
LEICESTER ALLEN,
CHAS. M. HIGGINS.